United States Patent [19]

Sinniger et al.

[11] Patent Number: 4,638,498

[45] Date of Patent: Jan. 20, 1987

[54] DIGITAL TIMING SYSTEM

[75] Inventors: Joseph O. Sinniger, Pennington; Anthony D. Robbi, Hopewell, both of N.J.

[73] Assignee: RCA Corporation, Princeton, N.J.

[21] Appl. No.: 780,898

[22] Filed: Sep. 27, 1985

Related U.S. Application Data

[62] Division of Ser. No. 437,836, Oct. 29, 1982, Pat. No. 4,575,809, which is a division of Ser. No. 161,454, Jun. 20, 1980, Pat. No. 4,375,209.

[51] Int. Cl.[4] .............................. G06M 3/02; F02P 5/04
[52] U.S. Cl. ....................................... 377/39; 123/416; 123/418; 377/49; 377/26
[58] Field of Search .............................. 377/39, 26, 49; 123/416, 414, 486, 417, 418; 364/431.04, 569

[56] References Cited

U.S. PATENT DOCUMENTS

| | | | |
|---|---|---|---|
| 3,903,857 | 9/1975 | Hönig et al. | 123/117 R |
| 4,009,378 | 2/1977 | Sakamoto | 123/418 |
| 4,018,197 | 4/1977 | Salway | 123/117 D |
| 4,063,539 | 12/1977 | Gorille et al. | 123/416 |
| 4,262,644 | 4/1981 | Walker | 123/418 |
| 4,296,471 | 10/1981 | Goux | 123/418 |
| 4,376,428 | 3/1983 | Hata et al. | 123/417 |

FOREIGN PATENT DOCUMENTS

| | | |
|---|---|---|
| 2323619 | 11/1973 | Fed. Rep. of Germany . |
| 2939984 | 5/1980 | Fed. Rep. of Germany . |
| 2900111 | 7/1980 | Fed. Rep. of Germany . |
| 2157289 | 5/1973 | France . |
| 2243348 | 9/1984 | France . |
| 66621 | 5/1975 | Japan . |
| 143995 | 11/1975 | Japan . |
| 1370105 | 10/1974 | United Kingdom . |
| 1430134 | 3/1976 | United Kingdom . |
| 1482626 | 8/1977 | United Kingdom . |
| 2033003 | 5/1980 | United Kingdom . |
| 2099079 | 12/1982 | United Kingdom ................ 123/417 |

Primary Examiner—John S. Heyman
Assistant Examiner—K. Ohralik
Attorney, Agent, or Firm—Joseph S. Tripoli; Robert L. Troike; Raymond E. Smiley

[57] ABSTRACT

A means to set spark timing in accordance with engine speed includes a counter to count clock pulses between engine speed reference pulses. A read-only memory has successive memory locations each storing an addend quantity and a repeats number. An adder unit, including an accumulator, operates to access the memory locations, and to add the addend quantities to the contents of the accumulator repeatedly a number of times equal to the respective repeats numbers. A comparator produces an ignition firing pulse when the contents of the accumulator corresponds with the reference period number provided by the counter.

3 Claims, 4 Drawing Figures

| POINT | SPEED RPM | P PERIOD μS | A ADVANCE ANGLE | A ADVANCE μS | P-A=S SPARK μS | ΔP/ΔS SLOPE | FRACTIONAL ADDENDS | INTEGRAL ADDENDS |
|---|---|---|---|---|---|---|---|---|
| ⓪ | 1,000 | 30,000 | 0° | 0 | 30,000 | | | |
| | | | | | | 1.0000 | 16.00 = | 16 X 1.00 TO MAX COUNT, MIN. RPM |
| ① | 1,395 | 21,505 | 0° | 0 | 21,505 | | | |
| | | | | | | 0.0000 | 0.00 = | 0.0 X 1.00 AT 21,505 |
| ② | 1,395 | 21,505 | 11.5° | 1,374 | 20,131 | | | |
| | | | | | | 0.8498 | 13.60 = | 14 X 0.60 + 13 X 0.40 TO 21,505 |
| ③ | 1,953 | 15,360 | 28.8° | 2,458 | 12,902 | | | |
| | | | | | | 1.1348 | 18.16 = | 19 X 0.16 + 18 X 0.84 TO 15,360 |
| ④ | 4,882 | 6,145 | 40.0° | 1,365 | 4,780 | | | |
| | | | | | | 1.2856 | 20.57 = | 21 X 0.57 + 20 X 0.43 TO 6,145 |
| ⑤ | INFINITE | 0 | 0° | 0 | 0 | | | |

DIGITAL TIMING SYSTEM

This is a division of application Ser. No. 437,836 filed Oct. 29, 1982, now U.S. Pat. No. 4,575,809, which is a division of application Ser. No. 161,454, filed June 20, 1980, now U.S. Pat. No. 4,375,209.

This invention relates to digital timing systems useful for determining spark advance according to speed of internal combustion engines.

The timing of the electrical spark in the spark plug of an internal combustion engine is varied, relative to the time the piston is at top dead center, in accordance with engine speed. The spark advance is increased as engine speed increases. In the past, the increase in spark advance with engine speed has been accomplished mechanically in the distributor by centrifugal means including springs and cams. Recently, the determination of spark advance in accordance with engine speed has been accomplished by electronic means including means for sensing engine speed, and a small computer for computing the proper spark advance at the sensed engine speed. Even though small computers can be made inexpensively by techniques of large scale integration, there is a powerful competitive necessity to make automotive components as inexpensive as possible. Accordingly, there is a need for a special-purpose electronic digital timing system, useful for spark advance determination, which is less expensive in large quantities than a system including a general purpose microcomputer.

In accordance with an example of the invention, a system for producing an output pulse at a time which is a function of the spacing of two input pulses, comprises a source of clock pulses, a counter connected to count the number of clock pulses occurring in the period between the two input pulses, a source of an addend quantity, adder/accumulator means to repeatedly add the addend quantity, and a comparator producing an output pulse when the sum provided by the adder/accumulator corresponds with the counted number of clock pulses.

Figure 1:
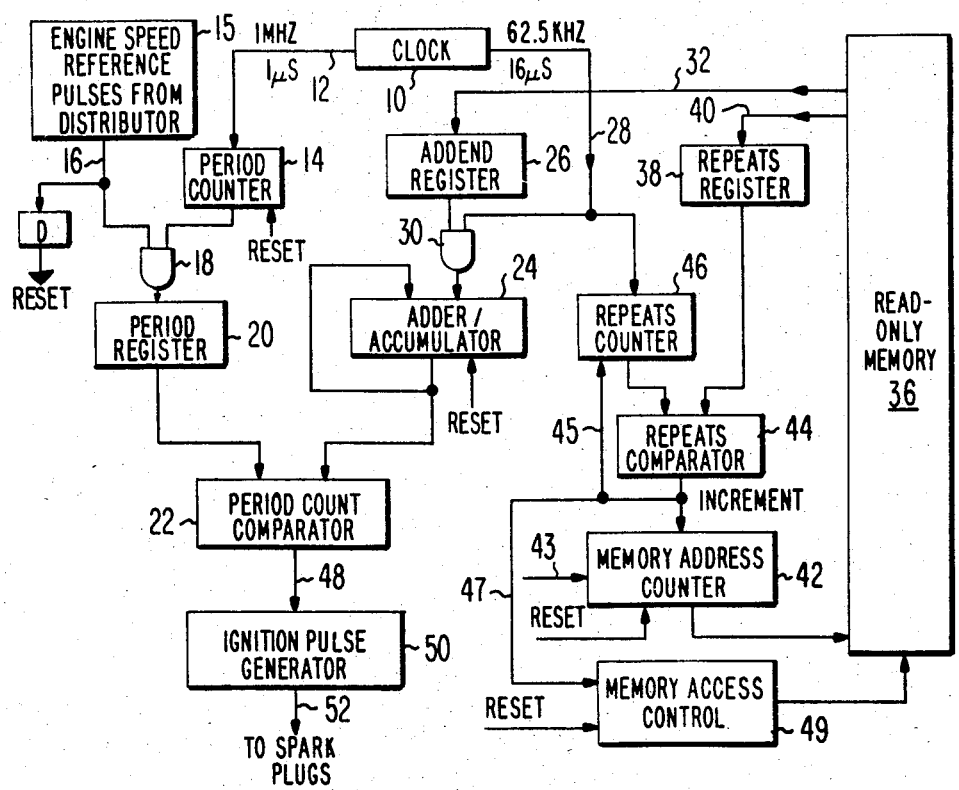
FIG. 1 is a simplified block diagram of an exemplary timing system constructed according to the teachings of the invention.

Referring now in greater detail to FIG. 1, a clock 10 has an output 12 providing pulses at a frequency of 1 MHz (a period of 1 $\mu$s) which is connected to the signal input of a period counter 14. The counter 14 is reset via delay means D every time an engine speed reference pulse is received on input terminal 16 from the ignition distributor 15.

The counter 14 continues counting until a next input pulse is received at 16 and enables an "and" gate 18 to transfer the count in counter 14 to a period register 20. After a slight delay provided by delay unit D, the input pulse produces a reset signal RESET which resets the counter 14 so that it can count the time period to the next following input pulse while the count reached during the last period is retained in period register 20.

The engine speed reference period between input pulses from the distributor depends on the speed of the engine in revolutions per minute (RPM), the number of cylinders of the engine, and whether the engine is a four-cycle, or a two-cycle engine. In the case of a four-cycle, four-cylinder engine, the reference period P in microseconds ($\mu$s) is equal to 30,000,000÷RPM of the engine. The periods P at six different values of RPM are given in the table of FIG. 4. The number of one-microsecond spaced clock pulses counted by counter 14 between two successive period reference pulses from input terminal 16 represents the reference period in microseconds at the existing engine speed.

The number in the period register 20 is continuously compared in period count comparator 22 with the number in an adder/accumulator 24. The number in 24 is produced by adding the number in an addend register 26 to the previous number in 24 every time one of the 16-microsecond-spaced clock pulses from clock 10 is applied over line 28 to enable an "and" gate 30. The addend register 26 is loaded over path 32 from a read-only memory 36 at the same time that a repeats register 38 is loaded over line 40 from the memory. The numbers supplied to addend register 26 and repeats register 38 come from a memory location having the address contained in a memory address counter 42.

The address counter 42 has an input RESET by which the low order bits in the counter are reset to zero for the start of a sequential addressing of memory locations containing a table of addends and repeats quantities for use, as will be described, in providing a desired spark advance vs. engine speed characteristic. The address counter 42 may also have an additional input 43 for a high order address bit by which to address a different table of addends and repeats quantities for use under some different engine condition, such as engine temperature, or intake manifold vacuum, or the like. A plurality of high order bits may be supplied to input 43 to determine which one of a plurality tables should be used.

The registers 26 and 38 may constitute the data register of the memory 36, rather than being separate from the memory. The registers 26 and 38 may receive the contents of two respective successive memory locations, rather than a single memory location.

The number in the repeats register 38 is continuously compared in a repeats comparator 44 with the count in a repeats counter 46 which counts the sixteen-microsecond-spaced clock pulses on line 28 from clock 10. When an equality is detected, the repeats comparator 44 increments the count in the memory address counter, and resets the repeats counter 46 over path 45, and supplies a control signal over path 47 to a memory access control unit 49, so that the memory 36 is caused to supply new numbers to the addend register 26 and repeats register 38. The same RESET pulse which resets counters 14 and 42, accumulator 24 and control 49 also resets counter 46 for the same reasons that the other elements are reset.

When the number in the adder/accumulator 24 equals the number in period register 20, the period count comparator 22 provides an output signal at 48 to an ignition pulse generator 50 to control the leading edge and duration of an ignition pulse applied over path 52 to spark plugs (not shown).

Figure 2:
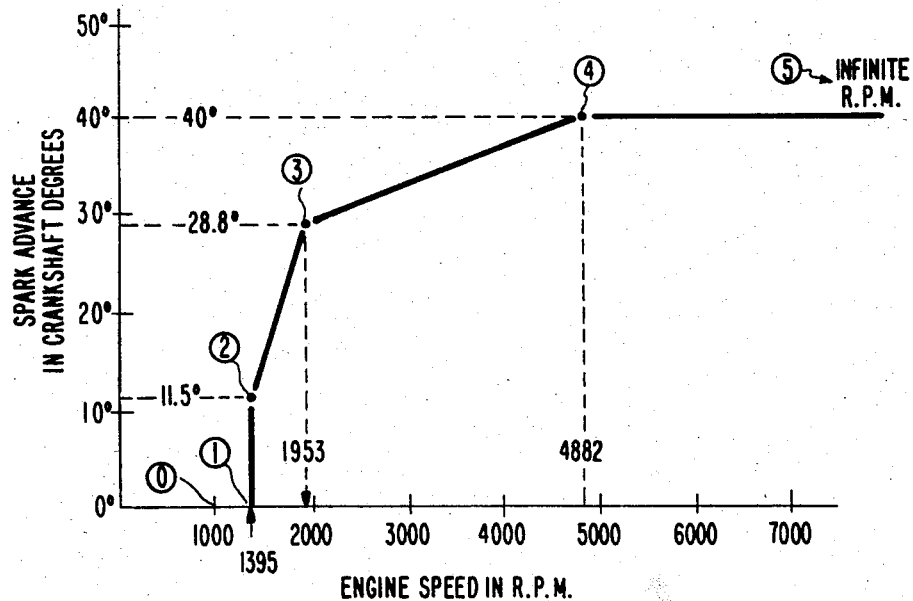
FIG. 2 is a chart showing an example of desired spark advance in crankshaft degrees for various values of engine speed in revolutions per minute.

FIG. 2 is an example of desired amounts of spark advance in crankshaft degrees for engine speeds between 1,000 rpm and 7,000 rpm. Specific points on the chart are labeled by circled numbers zero through 5 to identify correspondingly-labeled points in the chart of FIG. 3 and the table of FIG. 4. The values of RPM at the identified points in FIG. 2 are translated to corresponding values of reference interval or time period in FIGS. 3 and 4. The time period P between ignitions in a four-cycle, four-cylinder engine is given by P=30,000,000÷RPM, where P is time in microseconds. For example, an engine speed of 1,000 rpm corresponds with an ignition reference period of 30,000 μs, or the time required to count 30,000 pulses of one-megacycle clock.

The crankshaft degrees of spark advance in FIG. 2 can be translated to the time domain by the formula A=crankshaft degrees÷180 times P, where A equals spark advance in microseconds. The values of spark advance in terms of degrees and the corresponding values in microseconds are given in the table of FIG. 4.

Figures 3, 4:
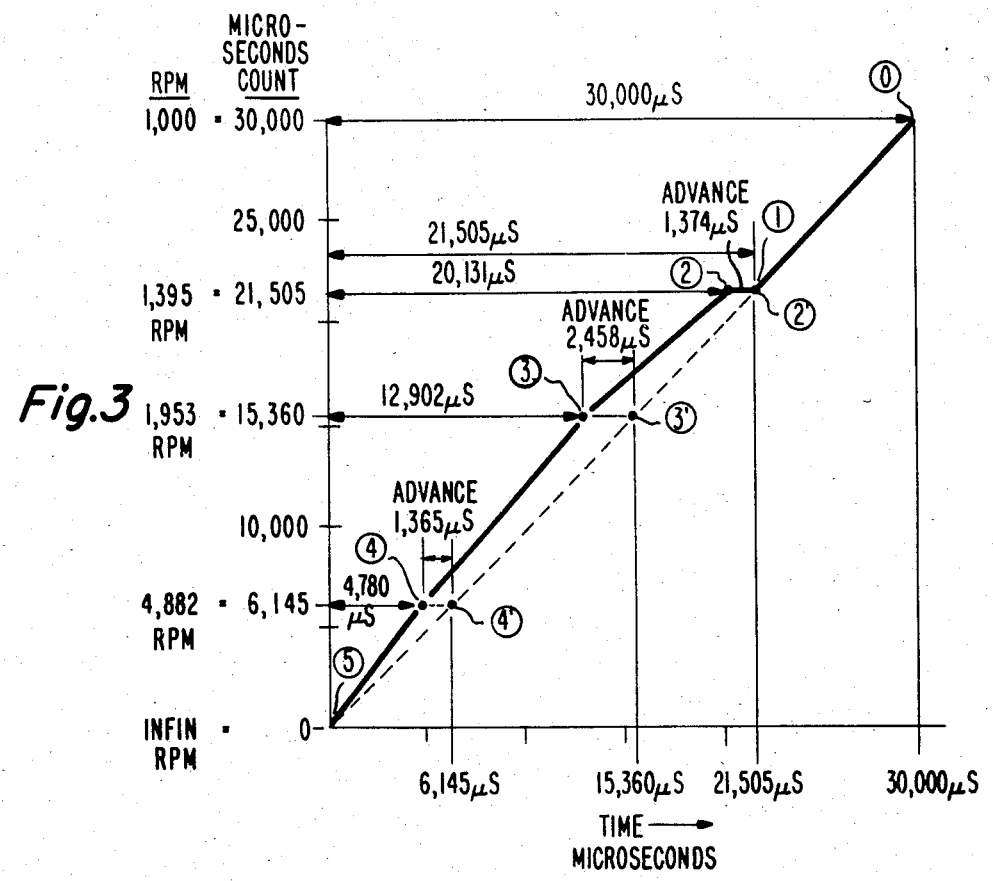
FIG. 3 is a chart which will be referred to in describing the operation of the timing apparatus of FIG. 1 in providing the exemplary desired spark advance timing shown in the chart of FIG. 2.
FIG. 4 is a table of values corresponding with the example illustrated by the charts of FIGS. 2 and 3.

In FIG. 3, the ordinate is marked with the five values of RPM, from FIG. 2, and the corresponding values of reference time period in terms of a count of one-microsecond-spaced clock pulses. The abscissa is marked with the same five values of time in microseconds. The operation of the apparatus of FIG. 1 will be described with reference to FIG. 3. The operation will be understood if it is remembered that the output 12 of clock 10 in FIG. 1 provides high-frequency pulses having a period of one microsecond, and that the output 28 of clock 10 provides sub-multiple frequency pulses having a period of sixteen microseconds. The count in period counter 14 increases by one every microsecond, and the output of adder/accumulator 24 increases by the amount in the addend register 26 every sixteen microseconds. If the number sixteen is in the addend register, the output of the adder/accumulator reaches the number stored in the period register 20 in the same number of microseconds as were required by the period counter to count to the number latched in the period register. If the number in the addend register is greater than sixteen, the output of the adder accumulator will reach the count latched in the period register in a shorter time. This shorter time is made to be the time to start the spark in the engine to provide a desired amount of spark advance for the speed of operation of the engine.

The operation of the apparatus of FIG. 1 will first be described for the condition represented by point 4 in FIGS. 2, 3 and 4 in which the engine is operating at a speed of 4,882 rpm, and the engine speed reference period between two successive pulses at line 16 from the distributor is 6,145 microseconds. During this reference time period, counter 14 counts to 6,145, and this count is transferred to, and stored in, the engine period register 20. It is known from FIG. 2 that at the 4,882 rpm engine speed, the spark advance should be 40 degrees. It is known from FIG. 4 that a 40 degree spark advance is equal to 1,365 microseconds, and that the spark should occur at a time of 1,365 microseconds *before* an engine period reference pulse, or 4,780 microseconds *after* an engine period reference pulse. The engine period reference pulses are spaced 4,780+1,365=6,145 microseconds. This is illustrated in FIG. 3 by the time of 4,780 μs to point 4, and the time of 1,365 μs between points 4 and 4', and the total time to point 4' of 6,145 μs.

In operation, a spark fire signal is generated by period count comparator 22 when the output of adder/accumulator 24 equals the count previously transferred to period register 20 and which represents the 6,145 microseconds period between input pulses at an engine speed of 4,882 rpm. The output of the adder/accumulator 24 reaches the count of 6,145 after only 4,780 microseconds because of the value of the addend which is supplied to the addend register 26 from the read-only memory 36, and the frequency with which the addend is added to the sum in the accumulator. In the example being described, the number in the addend register 26 is added to the number in the accumulator every sixteen microseconds as determined by the output 28 from clock 10. Therefore, if the number in the addend register is greater than sixteen, the output of adder/accumulator 24 will reach the count in period register 20 in less than the 6,145 microseconds between the period reference pulses from the distributor. In the example, if the number in the addend register is 20.57 the output of adder/accumulator reaches the count of 6,145 after a time period of 4,780 microseconds. When this equality occurs, the output of the comparator 22 causes an ignition spark at a time providing a spark advance of 1,365 microseconds, which is equal to a spark advance of forty crankshaft degrees.

The operation is one in which during the 6,145 microsecond period between input period pulses, the period counter 14 counts to 6,145, and during the first 4,780 microseconds of the following period between input period pulses, the output of adder/accumulator 24 reaches the count of 6,145 to determine the time to fire the ignition. This may be visualized as a counting by period counter 14 from the ordinate in FIG. 3 to a count of 6,145 at point 4' in a time period of 6,145 microseconds, and an accumulation in adder/accumulator 24 from the ordinate to a sum of 6,145 at point 4 after 4,780 microseconds. The slope of the dotted line from the ordinate to point 4' is unity, and the slope of the solid line from the ordinate to point 4 is 6,145÷4,780, or 1.2856. The quantity in the addend register 26 should be 16×1.2856 or 20.57, and the quantity in the repeats register 38 for the number of times this quantity 20.57 should be repeatedly added in adder 24 is 6,145÷20.57 or 299 times.

However, it is desirable to limit the size of the addend and repeats numbers to base ten numbers of 255 or less which can be represented by eight binary digits. This can be done by limiting the addend quantities to whole numbers between zero and 255, such as 20 and 21, and by limiting the repeats quantities to numbers below 256. In the example of operation at an engine speed of 4,882 rpm, the count of 6,145 can be reached by adding the number twenty-one in the adder/accumulator 57% of the time, and adding the number twenty 43% of the time. That is, the quantity 21 is put in addend register 26 and the quantity 170 is put in the repeats register 38, so that the quantity 21 is added to itself 170 times, to reach a count of 3,570. Then the quantity 20 is put in the addend register 26 and the quantity 129 is put in the repeats register, so that the quantity 20 is added 129 times to the quantity 3,570 to reach a total of over 6,145, when an ignition spark is started.

The first storage location in read-only memory 36 contains the addend quantity 21 and the repeats quantity 170, and the storage location has the first address provided by memory address counter 42. When the addend quantity 21 has been added to itself 170 times in adder/accumulator 24, the contents of repeats counter 46 equals the contents 170 of the repeats register 38, and the repeats comparator 44 provides an output which increments by one the count in the memory address register, resets the repeats counter 46 and stimulates the memory access control 49. Then, the second storage location in read-only memory 36 is accessed and the addend quantity 20 therein is transferred to the addend register 26, and the repeats quantity 129 therein is transferred to the repeats register 38. The addend quantity 20 is added to sum 3,570 in the adder/accumulator, and then added another 128 times, until the repeats counter 46 counts up to the figure 129 which equals the quantity 129 in the repeats register 38. The repeats comparator 44 detects the equality and increments the memory address counter for the accessing of the next or third storage location in memory 36.

However, after the addend quantity 20 is added in the adder/accumulator 34 the 129th time, the output 48 of the adder/comparator equals 6,150, which exceeds the quantity 6,145 in the period register 20. This is recognized by the period count comparator 22, which produces an output at 48 that causes the generation of the ignition pulse with a spark advance of 1,361 microseconds or 39.9 degrees, which is close enough to the exact spark advance of 1,365 microseconds or 40 degrees, which is desired for an engine speed of 4,882 rpm. The next input pulse at 16 from the distributor initially transfer the 6,145 count in period counter 14 to period register 20 through "and" gate 18, and then the slightly delayed reset pulse RESET resets the period counter 14, the adder/accumulator 24, the memory address counter 42 and stimulates the memory access control unit 49. Then, the described procedure repeats of counting the one-microsecond-spaced clock pulses until the next input pulse is received, and adding and accumulating addend quantities from memory 36 until an equality sensed by the period count comparator 22 causes another ignition spark. The process keeps repeating exactly as described, and provides a spark advance of 1,365 microseconds, or 40 degrees so long as the engine operates at a speed of 4,882 rpm.

If, for example, the engine is operating at a speed of 1,953 rpm, corresponding with the points 3 in FIGS. 2, 3 and 4, the time between input pulses from the distributor is 15,360 microseconds, and period counter 14 counts to this figure, and stores the number in period register 20 by the time the following input pulse is received. This corresponds with a movement from the origin in FIG. 3 to the circled point 3'.

During the interval until the next input pulse is received, the output of the adder/accumulator 24 increases exactly as has been described to a count of 6,145, which corresponds to a movement from the circled point 5 at the origin in FIG. 3 to the circled point 4, and then continues, using addends and repeats quantities from third and subsequent storage locations in memory 36, until the circled point 3 is reached. The slope of the line from point 4 to point 3 is 1.1348 as shown in FIG. 4, and addends should average 1.1348 times 16 or 18.16. This is accomplished by using an addend of 19 sixteen percent of the time and an addend of 18 eighty-four percent of the time. The number at the output of the adder/accumulator 24 reaches the number 15,360 in the period register 20 after a time of 12,902 microseconds, which is the time to start ignition when the engine speed is 1,953 rpm, and a spark advance of 2,458 microseconds, or 28.8 degrees, is desired.

If the engine speed is 1,395 rpm, the system goes through the counting and adding as described for the higher speeds and continues to the circled points 2 and 2' in FIG. 3, and causes a spark to start after 20,131 microseconds, which corresponds with a spark advance of 1,374 microseconds or 11.5 crankshaft degrees.

At engine speeds a trifle lower than 1,395 rpm, the output of the adder/accumulator 24 adds addends from addend register 26 to follow the solid curve in FIG. 3 from the origin through circled points 4, 3 to point 2, where the output count is 20,131, as has been described, Then, in going from circled point 2 to circled point 1, the output count should remain at 20,131. This is accomplished by using an addend from memory which is equal to zero for 1,374 microseconds, the period of time necessary to go from 20,131 microseconds to 21,505 microseconds. The contents of the addend register is used once every 16 microseconds, so the repeats number from memory 36 to the repeats register 38 should be about 86. Thus, the start of ignition spark is delayed until the spark advance is zero.

Then, at all lower engine speeds, more than a trifle less than 1,395 rpm, the spark advance remains at zero. This is accomplished by using an addend from memory equal to 16. Then at all lower engine speeds, the output of the adder/accumulator reaches the count in the period register 20 in the same period of time previously required for the period counter 14 to reach the same number. This is the condition represented in FIG. 3 by the solid line having a slope of unity between circled points 1 and 0.

The selection of the addend and repeats quantities for storage in the memory 36 can be made so that the system provides the desired spark advance characteristic with any desired degree of accuracy. The accuracy may be greater than provided by the quantities used in the foregoing description, or a lesser accuracy may be acceptable for the purpose of requiring less memory storage space.

While the system operation has been described for specific engine speeds, it will be understood that the system operates similarly at all other intermediate engine speeds. Also, it will be understood that although the system has been described for providing the amount of spark advance at different engine speeds shown in FIG. 2, the system can be constructed to generate ignition pulses according to any desired spark advance vs. engine speed relationship. Further, numerous different hardware implemetations of the system of FIG. 1 will suggest themselves to those skilled in the art to be within the scope of the invention as defined by the appended claims.

What is claimed is:

1. A system for producing an output pulse at a time which is a function of the spacing of two input pulses, comprising
    a source of clock pulses,
    a counter connected to count the number of clock pulses occurring in the period between said two input pulses,
    a source of an addend quantity,
    adder/accumulator means responsive to said source of clock pulses and to said source of an addend quantity to repeatedly add said addend quantity, and
    a comparator producing an output pulse when the sum provided by said adder/accumulator corresponds with the counted number of clock pulses.

2. A system for producing an output pulse at a time which is a function of the spacing of two input pulses, comprising
- a source of clock pulses,
- a counter connected to count and latch the number of clock pulses occurring in the period between said two input pulses,
- a memory having memory locations storing addend quantities and corresponding repeats numbers,
- adder/accumulator means operative after said count is latched to access said memory and add said addend quantities a number of times determined by corresponding repeats numbers, and
- a comparator producing an output pulse when the sum provided by said adder/accumulator corresponds with the latched count in said counter,
- said addend quantities and repeats numbers in said memory being selected so that said output pulse occurs at a time dependent on the spacing of the input pulses.

3. A system for producing an output pulse at a time which is a function of the duration $\Delta A$ of the time interval between two input pulses, comprising
- a source of clock pulses,
- a counter connected to count the number of clock pulses occurring during a time interval of duration $\Delta A$,
- a source of an addend quantity,
- adder/accumulator means responsive to said source of clock pulses and to said source of addend quantity to repeatedly add said addend quantity, and
- a comparator producing an output pulse when the sum provided by said adder/accumulator corresponds with the counted number of clock pulses.

* * * * *